United States Patent [19]

Schwartzman

[11] Patent Number: 4,763,410
[45] Date of Patent: Aug. 16, 1988

[54] METHOD FOR BRAIDED COAXIAL CABLE PREPARATION

[75] Inventor: Benjamin Schwartzman, Hagerstown, Md.

[73] Assignee: AMP Incorporated, Harrisburg, Pa.

[21] Appl. No.: 75,459

[22] Filed: Jul. 20, 1987

[51] Int. Cl.⁴ .................................... H01B 13/20
[52] U.S. Cl. ................................ 29/828; 81/9.51
[58] Field of Search .................. 29/828, 868, 869; 81/9.51

[56] References Cited

U.S. PATENT DOCUMENTS

| | | |
|---|---|---|
| 2,988,940 | 6/1961 | Folkenroth et al. . |
| 3,044,333 | 7/1962 | Broske . |
| 3,044,334 | 7/1962 | Broske . |
| 3,085,455 | 4/1963 | Hurlbut .................. 81/9.51 |
| 3,139,778 | 7/1964 | Bielinski et al. ........... 81/9.51 |
| 3,153,358 | 10/1964 | Havens ................... 81/9.51 |
| 3,339,437 | 9/1967 | Hamilton et al. .......... 81/9.51 |
| 3,484,936 | 12/1969 | Schwalm et al. . |
| 3,577,814 | 5/1971 | Hammond . |
| 3,590,666 | 7/1971 | Langer .................. 81/9.51 |
| 3,621,560 | 11/1971 | Le Bright ............... 29/828 |
| 4,538,487 | 9/1985 | Hatfield et al. . |

OTHER PUBLICATIONS

BNC and TNC Connectors for Coaxial Cable, Catalog 83-719, issued 8/84, p. 33.
AMP Semi-Rigid Cable Stripping Machine, No. 220211-1, CM 2909, Released 7/14/80, Entire Brochure.
AMP Coaxial Cable Stripping Machine No. 253326-1, CM 2365, Rev G, Entire Brochure.

Primary Examiner—Howard N. Goldberg
Assistant Examiner—Carl J. Arbes
Attorney, Agent, or Firm—William B. Noll

[57] ABSTRACT

A method for preparing braided coaxial cable for termination is taught wherein a segment of the cable outer jacket is defined by an annular slit, lightly clamped and axially displaced, then clamped firmly and axially displaced in a reverse sense to cause the cable braid beneath such jacket to be displaced radially outwardly. The braid so displaced is then trimmed and removed with a further segment of the cable being defined by an annular slit which for the segment is axially displaced to cover over the cut ends of the braid, leaving the coaxial cable prepared for termination.

4 Claims, 3 Drawing Sheets

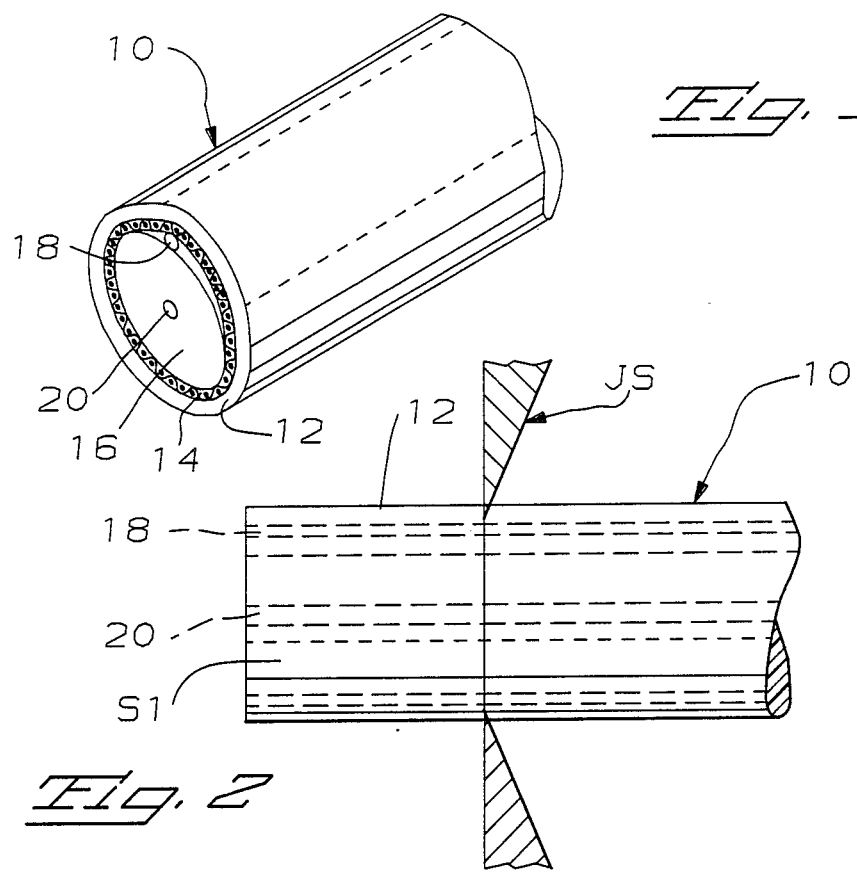
Fig. 1
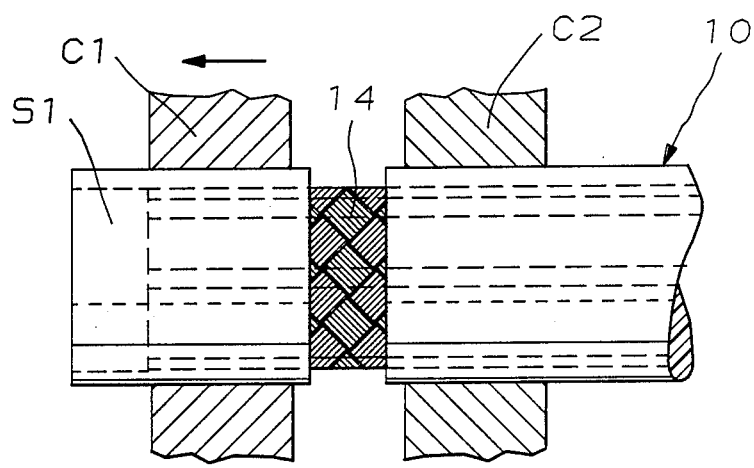
Fig. 2
Fig. 3

METHOD FOR BRAIDED COAXIAL CABLE PREPARATION

The present invention relates to an improved method for preparing coaxial cable of a type having a central signal conductor surrounded by a dielectric sleeve in turn surrounded by a conductive sleeve of fine flexible braided conductors in conjunction with a ground wire disposed there beneath, all surrounded by an outer protective jacket. The method teaches how to prepare such cable for subsequent termination and use and involves removing the outer conductive braid to expose end portions of the cable for subsequent termination in a manner minimizing cable component damage.

BACKGROUND OF THE INVENTION

Coaxial cables for transmitting electronic signals have been widely used for many decades including particularly coaxial cables having an outer conductive grounding and shielding structure in the form of small conductive wires woven into a braided sleeve. The use of braiding makes the cable flexible and at the same time offers a degree of protection against signals being induced into the coaxial cable to interfere with signals carried therein, or, alternatively, protecting against radiation outwardly of said cable due to signals carried therein. Additionally, the braided conductors can be employed for grounding purposes, carrying the circuit grounds necessary to define a coaxial structure. More recently, coaxial cable has, for a variety of purposes including the need for higher and higher densities, been made relatively small. By this is meant that cables heretofore a quarter of an inch or larger in diameter are now regularly found for the 50, 75 and 90 OHM characteristic impedance cables on the order of a tenth of an inch in diameter.

Very small coaxial cables include very small constituent parts making the cables difficult to prepare for termination. Particularly difficult is the removal of segments of braid which is frequently formed of conductors in diameter only a few thousandths of an inch per conductor. Braid of this type is not only small but quite delicate and difficult to handle with respect to both cutting, stripping, removal and manipulation for termination purposes.

The typical approach to handling cable of the foregoing types is to utilize great precision, jigs, fixtures, and to experience a process which is both time consuming, expensive and fraught with low yields due to damage to the cable, braid, and the cable itself. To place this background in further perspective, reference is made to a typical 75 OHM coaxial cable construction now being widely used in industry for the transmission of data signals. The cable has an outer diameter on the order of 0.105 inches maximum with an outer jacket of PVC on the order of 0.012 inches in thickness surrounding a braid comprised of Number 38 AWG tin plated copper conductors which surrounds a drain conductor on the order of 0.012 inches in diameter. This is laid beneath the braid and over a dielectric sheath comprised of a foamed high density polyethylene surrounding a central signal conductor on the order of 0.010 inches in diameter. The drain conductor is in contact with the braid along the length thereof and serves to extend the grounding path of the cable therealong. In general, cable of this type must be cut to length, both ends being severed with subsequent steps including exposure of the central conductor, removal of portions of the braid and portions of the drain conductor and removal of portions of the outer jacket or sheath accomplished as part of a stripping and cable preparation prior to termination to coaxial connectors for one or both ends of the cable. In all of this, it is important not to have loose or cut ends of the braid in the position to effect a shorting of the cable, to avoid nicking or cutting through the cable dielectric or nicking or cutting the central conductor and drain wires which could result in a subsequent breakage and loss of cable integrity.

SUMMARY OF THE INVENTION

The present invention is directed to and has as its object a method of preparing coaxial cable for termination to coaxial connectors in an improved manner. This is accomplished by first severing the cable outer jacket or sheath to define a first segment, displacing such segment axially along the cable end over the cable braid and then reversing such displacement while clamping the jacket against the braid radially inwardly. This causes the braid to spread outwardly in a radial sense, forming a disk of braid which can then be readily severed and removed with the jacket segment then being permanently removed to leave the cable drain wire, dielectric sheath and signal wire clear for subsequent manipulation and termination into a coaxial connector. Additionally, and as an alternative step where necessary to preclude the presence of the sharp cut ends of the braid, the cable outer jacket may be further severed to form a second segment which is then axially displaced to cover over the cut ends of the braid, not only precluding damage from such cut ends but holding the braid intact during subsequent manipulation of the cable end for termination.

BRIEF DESCRIPTION OF THE DRAWINGS

FIG. 1 is a perspective of a coaxial cable much enlarged from actual size with a cut end depicting the cable components.

FIG. 2 is a side view of the cable of FIG. 1 showing severing of the cable outer jacket to define the initial step of the method of the invention.

FIG. 3 is a view of the cable of FIG. 2 with the cable end severed segment clamped and relatively displaced.

DESCRIPTION OF THE INVENTION

Figure 3A:
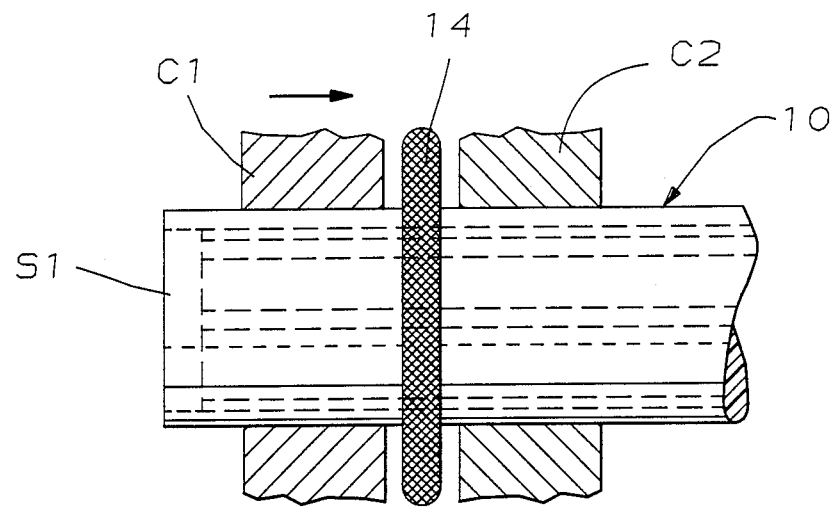
FIG. 3A is a view of the cable of FIG. 3 with the cable segment displaced in a reverse sense showing the development of the braid into a flanged appearance.

Referring now to FIG. 1, an end of a coaxial cable 10 is shown much enlarged relative to actual size, the actual size relating to an outer dimension on the order of a tenth of an inch and as detailed in the Background of the Invention heretofore presented. The cable 10 includes an outer jacket 12 which typically is of a polyvinyl chloride material which forms a sheath covering the cable components and acts to protect and seal the cable components during the life of the cable. Within jacket 12 is an outer shielding and grounding conductive sleeve which is made flexible as by braiding copper wires, the braid being shown as 14 in FIG. 1. Within the braid is a dielectric sheath or sleeve shown as 16. In contact with braid 14 and extending along the periphery of the dielectric sheath 16 is a drain or grounding conductor 18 and centered within the sheath 16 is a central signal conductor shown as 20 in FIG. 1. These components form the coaxial cable and high frequency analog or the digital signals can be propagated therealong and interconnected by suitable coaxial connectors terminated to the signal and grounding or shielding structures of the cable. The braid 14 being comprised of fine copper wires is flexible and yet adequate to protect the signals being carried by the cable from being unduly influenced by radiation or signals in the surrounding environment or as heretofore mentioned, radiating outwardly to effect other cables nearby. The conductor 18 carries a separate conductive grounding circuit path along the cable as well as effectively grounding or "draining" the braid and any signals induced therein.

Reference is now made to my earlier and copending application entitled Clamping Tool and Stripping Method for Coaxial Cable, filed Apr. 27, 1987 and carrying the Ser. No. 043,604 for a teaching of both appropriate stripping or jacket cutting blades and clamping mechanisms for clamping the cable for manipulation of the method of the invention hereinafter described. The aforementioned application is incorporated herewith by reference. The stripping blades and clamping mechanisms of the aforementioned application are preferred. It, however, being understood that severing of the cable may indeed be done by a number of stripping tools and techniques including the careful application of razor blades with clamping effectively being done by the cable being held in the fingers of an operator.

Referring now to FIG. 2, the first step of the method of the invention is revealed. There a segment shown as S1 of the cable outer jacket 12 is formed by annularly slitting or severing of the cable through blades shown as JS driven inwardly to close against the cable and cut jacket 12, care being taken not to sever the braid lying beneath the jacket. As a next step, the segment S1 is displaced axially, to the left as shown in FIG. 3, to leave a segment of the braid 14 exposed. With respect to the cable of the type heretofore described, the segment of the braid and therefore the displacement of segment S1 of the cable jacket can be on the order of 0.150 inches. At this time, the cable and the segment are clamped as by clamps of a type shown in my previously mentioned application Ser. No. 043,604, and depicted in FIG. 3 by the clamp C1 driven against the segment S1 and by clamp C2 driven inwardly to hold the cable 10 relatively fixed. With respect to the first axial displacement as shown in FIG. 3, the segment S1 should be lightly held so as to slip free of and over the braid 14 with the second axial displacement in a reverse sense being effected with the segment S1 more tightly clamped to cause the braid itself to be displaced.

Figure 4:
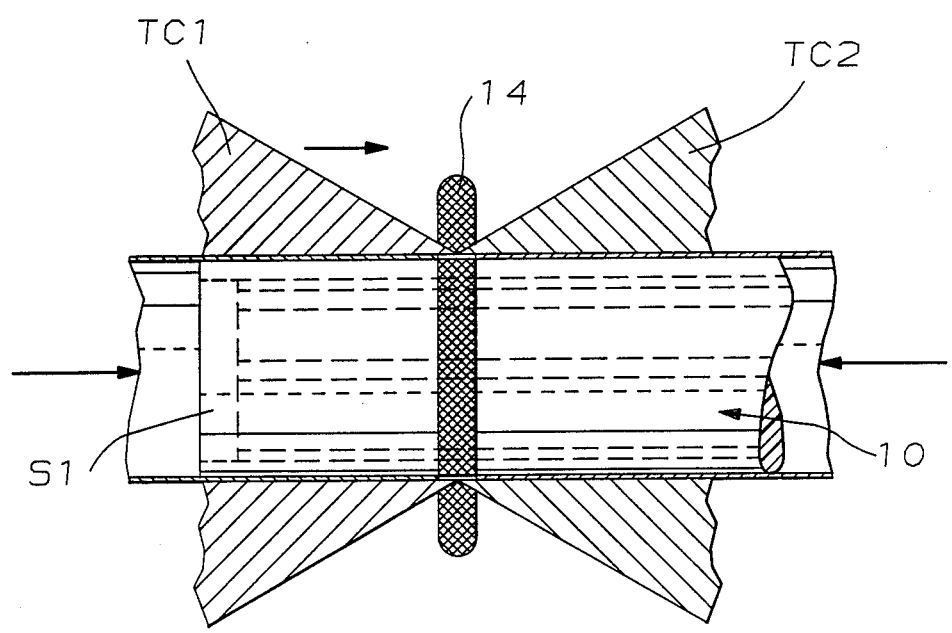
FIG. 4 a view of the cable of FIG. 3A with tubular cutting tools poised to sever the flanged cable braid.

The displacement of the braid radially outwardly due to the movement of the segment S1 of the jacket continues until the braid assumes a shape shown cross-hatched in FIGS. 3A and 4, adopting a flanged appearance. With the braid in the position shown in FIG. 4, tubular braid cutting tools shown as TC1 and TC2 may be then employed to sever the radially displaced ring of braid material.

Figure 5:
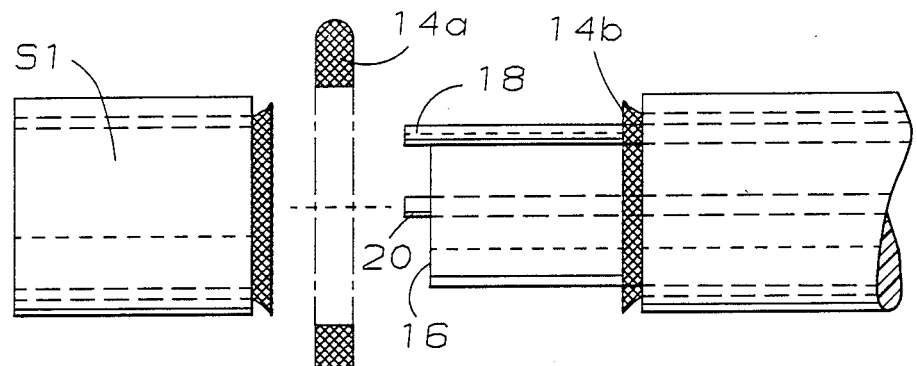
FIG. 5 a view of the cable of FIG. 4 with the severed segment of the cable and braid removed to expose the cable for subsequent termination.

FIG. 5 shows the severed braid ring 14a and segment S1 now removed from the cable end, leaving the cable drain wire 18 and dielectric sheath 16 exposed. Thereafter, the drain wire 18 may be deformed and manipulated for termination, the outer dielectric sheath 16 or a portion thereof, stripped to expose the center conductor 20 for subsequent termination to a coaxial conductor or directly to conductive posts or conductive paths, forming terminations to printed circuit boards or the like. Reference is made to U.S. patent application Ser. No. 897,577 filed Aug. 18, 1986, in the name of N. R. Birch et al for a type of coaxial termination, utilizing the signal and drain wires of a coaxial cable. The cable as shown in such application differs from the present cable in that the outer shielding jacket has formed a foil rather than a braid and the dielectric sheath in the mentioned case is of a very soft and porous dielectric material whereas in this case, the dielectric sheath is relatively firm. The principle of the connector use with cables is however shown as applicable to this method of preparation.

Figure 6:
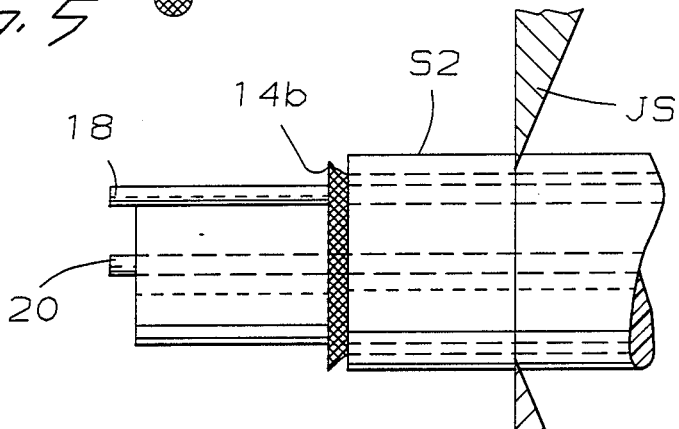
FIG. 6 a view of the cable of FIG. 5 showing a second severing of the jacked with the cable to define a further segment.
Figure 7:
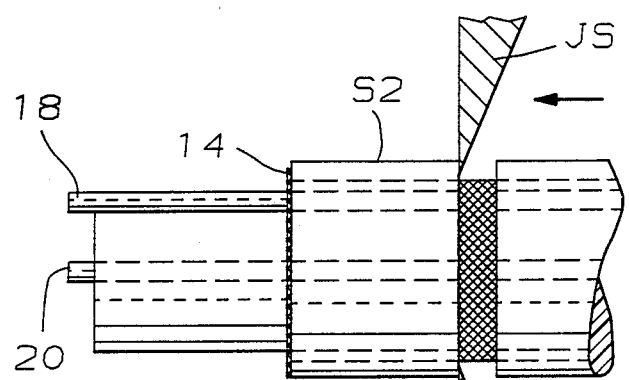
FIG. 7 depicts the displacement of the further segment of the outer jacket to cover over the cut braid ends and secure the braid against unraveling.

As will be observed from FIG. 5, the cut ends 14b of the braid are exposed which may be a disadvantage in use in certain applications wherein the cables are employed in relatively high density applications and one of such cut ends could find its way to a shorting contact with the signal or grounding parts of a connector or other interconnecting ensemble. To remedy this specific problem, the method of the invention contemplates as illustrated in FIG. 6 the provision of a further severing of the cable as by blades JS to form a second segment S2. As shown in FIG. 7, this segment S2 is displaced axially, to the left in FIG. 7, to cover over the cut ends 14b of the braid. This manipulation does leave a section of the braid 14 exposed, but it is removed from the surface of the cable by the thickness of the jacket 12 and may be confined within the coaxial connector structure subsequently added to the prepared cable end. In accordance with a preferred application of the method, the segment S2 was made to be approximately 0.030–0.080 inches in length, preferably about 0.040 inches, and the spacing between the segment and the severed cable end was approximately 0.040–0.070 inches in length, preferably about 0.050 inches.

While the invention method has been disclosed relative to a specific coaxial cable, it is contemplated that the invention may be utilized wherever the cable outer conductive and grounding sleeve is sufficiently flexible and expandable to be radially expanded in the manner shown. The invention can be practiced essentially by hand using ordinary dikes to cut and remove the radially displaced braid in a series of cutting steps, the displacement of the segments S1 and S2 being done by hand, and the severing of the cable jacket being done also by hand, utilizing standard coaxial cable stripping tools or razor blades or more preferably, the tools disclosed in the previously mentioned application Ser. No. 043,604.

I claim:

1. In a method for preparing for termination, a coaxial cable of the type having construction which includes a central signal conductor surrounded by a dielectric sheath, in turn surrounded by a flexible conductive sleeve and an outer protective insulating jacket, the steps comprising:

a. slitting the said jacket to completely sever said jacket and form a first segment thereof spaced from the end of the said cable, b. displacing said first segment axially over the end of said cable in a first direction, c. clamping said first segment to frictionally engage the material thereof with said conductive sleeve and axially displacing said first segment in an opposite direction to cause said conductive sleeve to be displaced radially outward, d. severing said conductive sleeve as so displaced radially outwardly and removing said cable end and said severed sleeve portion from said cable.

2. The method of claim 1, including the additional step of slitting and severing said jacket to form a second segment and displacing said second segment axially to cover the ends of said conductive sleeve as severed.

3. In a method for preparing coaxial cable for termination, said cable being of a type having a central signal conductor surrounded by a dielectric sheath having at least one ground conductor extending along said sheath with said sheath being covered over by flexible, conductive braid in contact with said grounding conductor therealong and further covered over by an outer protective insulating jacket, the steps comprising:

a. forming a first segment spaced from the end of said cable by slitting said outer jacket to completely sever said outer jacket, b. displacing said first segment axially over the end of said cable to separate said jacket from said conductive braid, c. clamping said first segment against said conductive braid and displacing said segment axially to cause said conductive braid to be displaced radially outwardly around the periphery of said cable extending beyond said jacket, d. severing and slitting said conductive braid as displaced outwardly, e. removing said first segment and said severed portion of said braid from said cable end, and f. forming a second segment by slitting said jacket and displacing said second segment axially along said cable whereby to cover the severed ends of said conductive braid.

4. In a method for causing over the cut ends of a conductive braid of a coaxial cable wherein the said cable includes an outer insulating jacket covering the cable braid and the said cable has been cut off having a segment of jacket removed to expose cut ends of said braid the steps comprising:

a. severing said jacket of said cable annularly to define a segment thereof, b. clamping said segment of said cable lightly to allow displacement axially along said cable, and c. displacing said segment of said cable as clamped axially for a short distance so that said segment covers over the cut ends of the braid.

* * * * *